(12) United States Patent
Zajkowski

(10) Patent No.: US 9,519,560 B2
(45) Date of Patent: Dec. 13, 2016

(54) METHOD FOR AUTOMATIC MAPPING OF AC PHASE CONDUCTORS AND IDENTIFICATION OF AC BUSES IN A MULTI-BUS POWER SYSTEM

(71) Applicant: Liebert Corporation, Columbus, OH (US)

(72) Inventor: Richard J. Zajkowski, Powell, OH (US)

(73) Assignee: Liebert Corporation, Columbus, OH (US)

( * ) Notice: Subject to any disclaimer, the term of this patent is extended or adjusted under 35 U.S.C. 154(b) by 221 days.

(21) Appl. No.: 14/164,891

(22) Filed: Jan. 27, 2014

(65) Prior Publication Data

US 2014/0281649 A1 Sep. 18, 2014

Related U.S. Application Data

(60) Provisional application No. 61/779,846, filed on Mar. 13, 2013.

(51) Int. Cl.
*G06F 11/30* (2006.01)

(52) U.S. Cl.
CPC ....... *G06F 11/3062* (2013.01); *G06F 11/3006* (2013.01); *G06F 11/3048* (2013.01);
(Continued)

(58) Field of Classification Search
CPC .............. G06F 11/3062; G06F 11/3006; G06F 11/3048; G06F 11/3051; G06F 11/3089
See application file for complete search history.

(56) References Cited

U.S. PATENT DOCUMENTS 7,269,753 B2 9/2007 Farkas et al.
7,395,444 B2 7/2008 Ives
(Continued)

FOREIGN PATENT DOCUMENTS

CN 1500439 A 6/2004
CN 101907655 A 12/2010
(Continued)

OTHER PUBLICATIONS

SIPO Office Action and Search Report issued Aug. 29, 2016 in corresponding Chinese Application No. 201410092843.9.
(Continued)

*Primary Examiner* — Thomas Lee
*Assistant Examiner* — Chad Erdman
(74) *Attorney, Agent, or Firm* — Harness, Dickey & Pierce, P.L.C.

(57) ABSTRACT

A system is disclosed for detecting if a remote device is associated with a power supply. The system may have a controller having machine readable, non-transitory executable code running thereon for varying a characteristic of a signal being applied to the power supply. The controller further may be configured to compare a measurement obtained from a measurement subsystem relating to a measured signal present at the remote device. The controller may also be configured to make a comparison between the signal being applied to the power supply and the measured signal obtained at the remote device, and to determine whether the remote device is electrically associated with the power supply.

18 Claims, 3 Drawing Sheets

Figure 1:
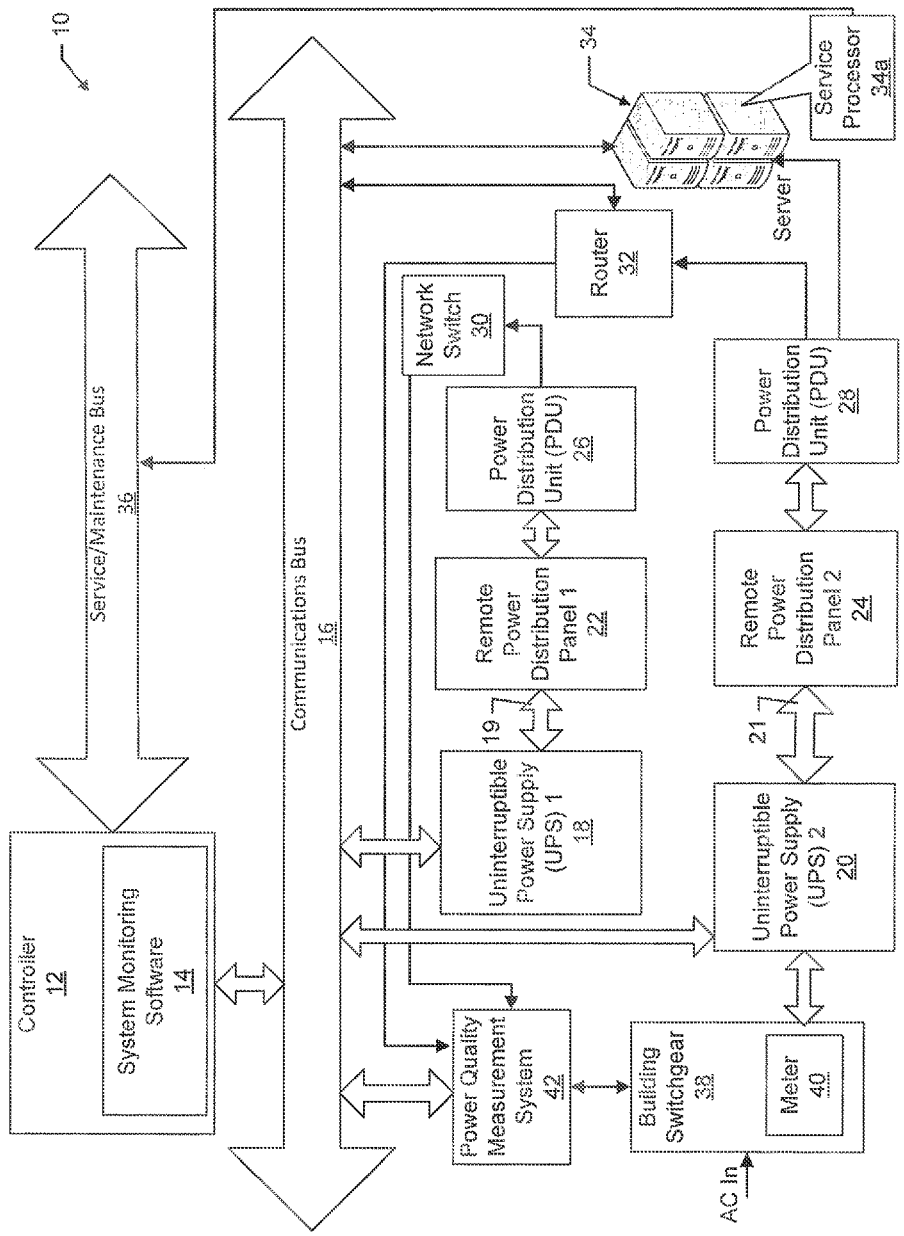

(52) U.S. Cl.
CPC ...... *G06F 11/3051* (2013.01); *G06F 11/3089* (2013.01); *G06F 11/3058* (2013.01)

(56) References Cited

U.S. PATENT DOCUMENTS

| | | | |
|---|---|---|---|
| 7,500,120 B2 | 3/2009 | Egan et al. | |
| 7,917,792 B2 | 3/2011 | Brech et al. | |
| 2004/0042145 A1* | 3/2004 | Garnett | G01R 31/40 361/115 |
| 2005/0101842 A1* | 5/2005 | Suda | A61B 5/7475 600/300 |
| 2006/0265613 A1* | 11/2006 | Egan et al. | G06F 1/30 713/300 |
| 2007/0286305 A1* | 12/2007 | Saggini | H04B 3/548 375/272 |
| 2009/0287943 A1 | 11/2009 | Brey et al. | |
| 2009/0287949 A1 | 11/2009 | Bradicich et al. | |
| 2011/0150431 A1* | 6/2011 | Klappert | H04N 7/163 386/296 |
| 2011/0234199 A1 | 9/2011 | Baert | |
| 2011/0270461 A1* | 11/2011 | Van Heuklon | G06F 11/3006 700/297 |
| 2012/0195355 A1* | 8/2012 | El-Essawy | H04B 3/54 375/222 |
| 2013/0264889 A1* | 10/2013 | Quittek | G01D 4/002 307/125 |

FOREIGN PATENT DOCUMENTS

| | | |
|---|---|---|
| JP | H08-240632 A | 9/1996 |
| JP | 102144168 A | 8/2011 |

OTHER PUBLICATIONS

Liu, J., "Automatic Server to Circuit Mapping with The Red Pills," Power, 500 (2010), p. 550.

* cited by examiner

METHOD FOR AUTOMATIC MAPPING OF AC PHASE CONDUCTORS AND IDENTIFICATION OF AC BUSES IN A MULTI-BUS POWER SYSTEM

CROSS-REFERENCE TO RELATED APPLICATIONS

This application claims the benefit of U.S. Provisional Application No. 61/779,846, filed on Mar. 13, 2013. The entire disclosure of the above application is incorporated herein by reference.

FIELD

The present disclosure relates to the operation of uninterruptible power supplies ("UPSs"), and more specifically to a system and method which is able to detect which specific devices are operably associated with which UPSs in a given facility.

BACKGROUND

This section provides background information related to the present disclosure which is not necessarily prior art.

Moving, adding and changing power infrastructure and IT equipment, load balancing and power capping all require accurate and timely knowledge of power mapping from AC source to IT equipment. Methods presently exist to send intelligent signals over the AC power line (i.e., the "X-10" protocol). However, these methods typically require complex algorithms. Moreover, they do not scale easily and often suffer from signal attenuation when passing through capacitive and inductive devices. Still further, they often do not include power phase information and often require additional circuitry to be installed into new or existing IT and power equipment.

Another existing system relies on agent software installed in every server in a data center. Power measurements are made at the rack level. The system is quite complex, and while it may provide identification down to individual servers, it does not have the capability of mapping connections back to the building AC power source (i.e., mapping connections "upstream" of the UPS).

Still further, existing systems that are able to associate a specific UPS with one or more downstream devices being powered by the UPS still may not be able to identify which specific phases of a multi-phase UPS output the device(s) is/are associated with. For those components that are powered by only one or two phase(s) of a multiphase output from a given UPS, it would be valuable to be able to also identify which individual phases are powering which downstream devices.

Accordingly, it will be appreciated that existing methods for power mapping from an AC source to IT equipment can represent a significant cost investment and still be subject to significant limitations.

SUMMARY

This section provides a general summary of the disclosure, and is not a comprehensive disclosure of its full scope or all of its features.

In one aspect the present disclosure relates to a system for detecting if a remote device is associated with a power supply. The system may comprise a controller having machine readable, non-transitory executable code running thereon for varying a characteristic of a signal being applied to the power supply. The controller further may be configured to compare a measurement obtained from a measurement subsystem relating to a measured signal associated with the remote device. The controller may also be configured to make a comparison between the signal being applied to the power supply and the measured signal associated with the remote device, and to determine whether the remote device is electrically associated with the power supply.

In another aspect the present disclosure relates to a system for detecting and mapping which ones of a plurality of electrically powered devices are being powered by a power supply. The system may comprise a controller having machine readable, non-transitory executable code running thereon for varying a characteristic of a power signal being supplied by the power supply, by a predetermined amount, to produce a modified input signal. The controller may further be configured to compare measurements obtained from a measurement subsystem relating to an input signal present at each of the plurality of electrically powered devices. Based on comparisons between the measurements and the modified input signal, the controller may be configured to detect which ones of the plurality of electrically powered devices are being powered by the given power supply.

In still another aspect the present disclosure relates to a method for detecting if a remote device is associated with a power supply. The method may comprise using a controller having machine readable, non-transitory executable code running thereon to vary a characteristic of a signal being applied to the power supply. The controller may be used to compare a measurement obtained from a measurement subsystem relating to a measured signal associated with the remote device. The controller may also be used to determine, based on a comparison between the signal being applied to the power supply and the measured signal associated with the remote device, whether the remote device is electrically associated with the power supply.

Further areas of applicability will become apparent from the description provided herein. The description and specific examples in this summary are intended for purposes of illustration only and are not intended to limit the scope of the present disclosure.

DRAWINGS

Figure 2:
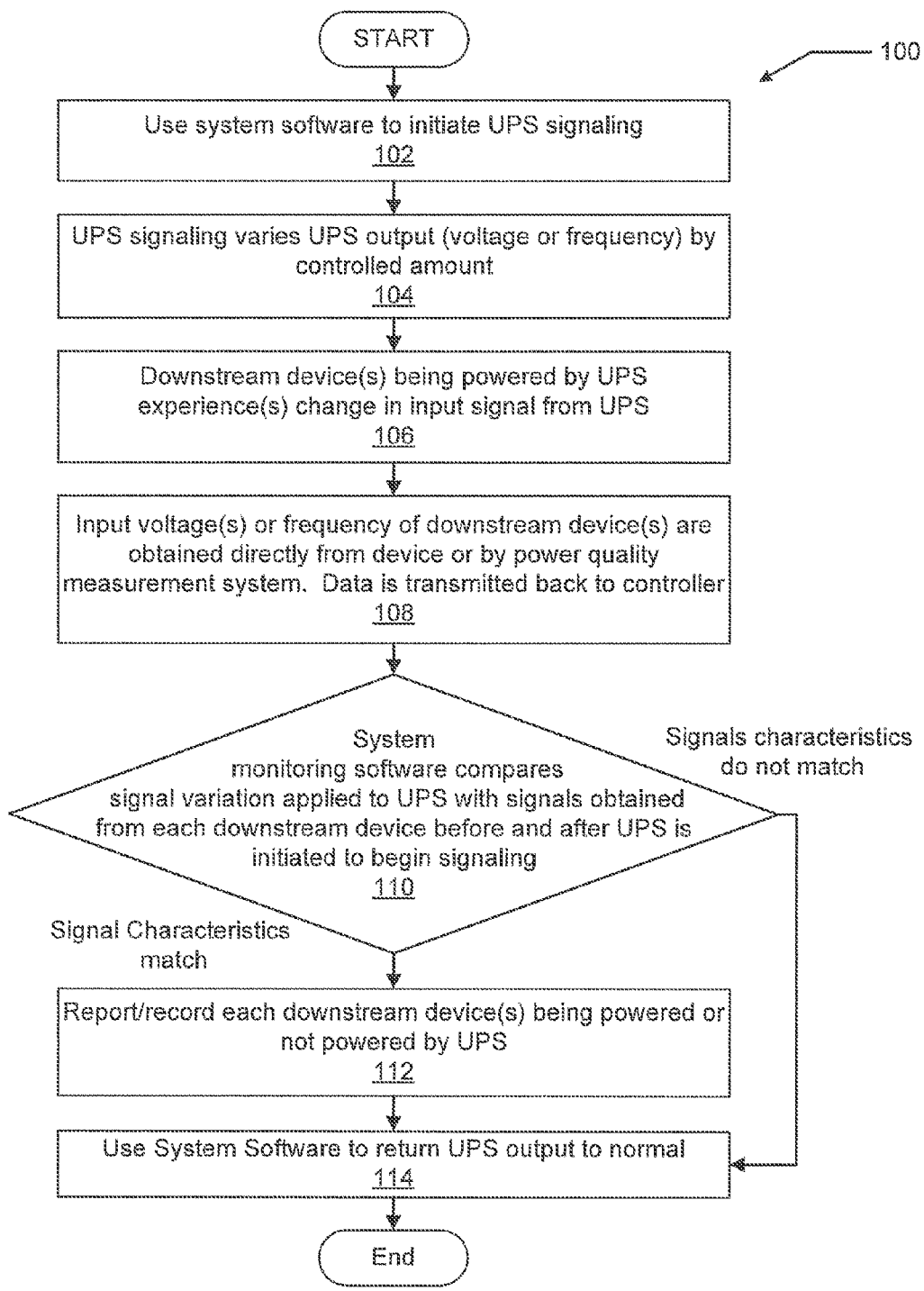
Figure 3:
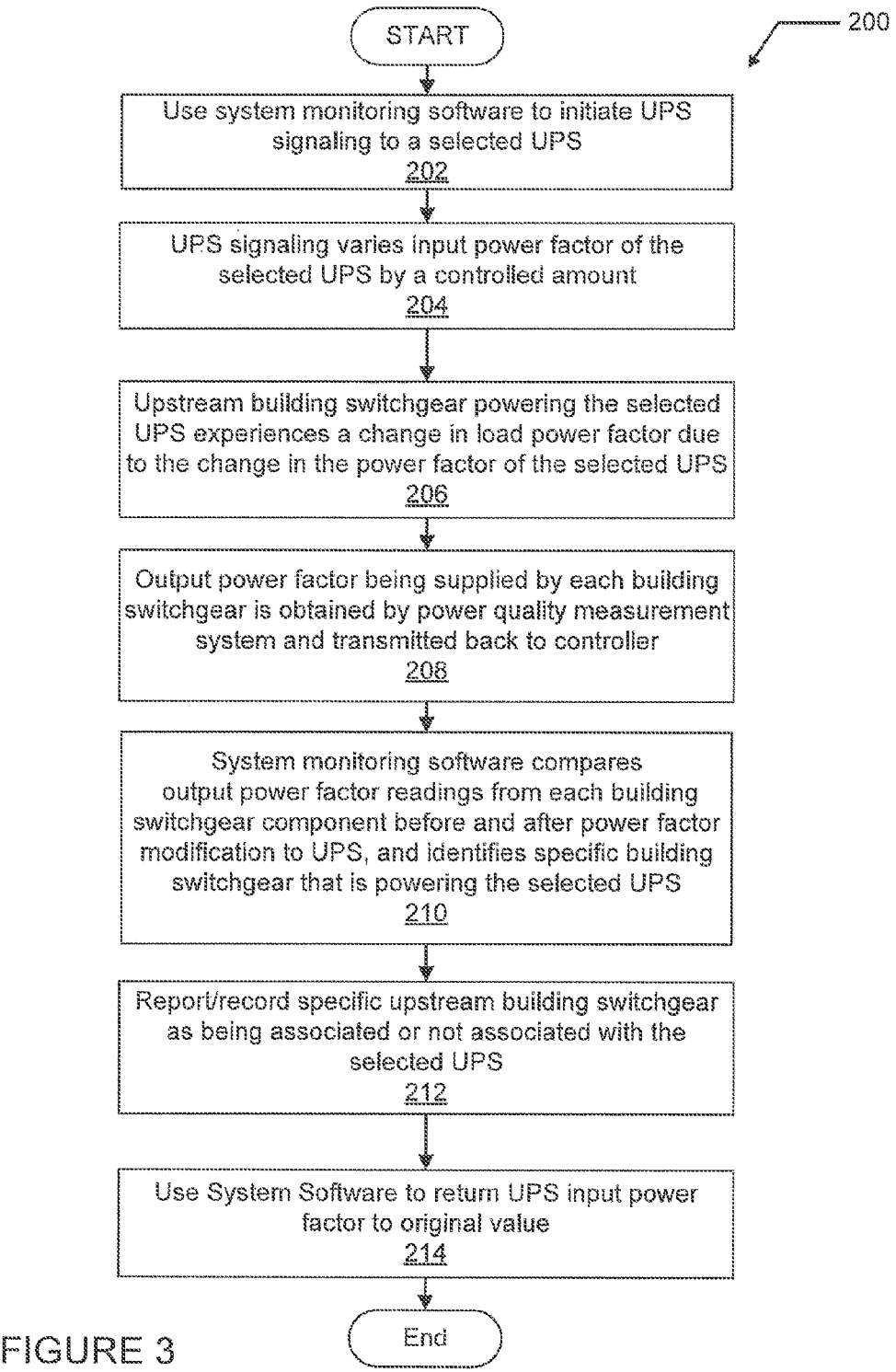

The drawings described herein are for illustrative purposes only of selected embodiments and not all possible implementations, and are not intended to limit the scope of the present disclosure. Corresponding reference numerals indicate corresponding parts throughout the several views of the drawings. In the drawings:

FIG. 1 is a high level block diagram illustrating one embodiment of the present disclosure in which components both upstream and downstream of an uninterruptible power supply ("UPS") are able to be identified by controlling at least one aspect of operation of the UPS, for example its output voltage;

FIG. 2 is a flowchart illustrating one example of a sequence of operations that may be performed by the system of FIG. 1 in identifying one or more components downstream from a selected UPS that are being powered by the selected UPS; and FIG. 3 is a flowchart illustrating one example of a sequence of operations that may be performed by the system of FIG. 1 in identifying which one of a plurality of upstream devices are supplying power to a selected UPS.

DETAILED DESCRIPTION

Example embodiments will now be described more fully with reference to the accompanying drawings.

Referring to FIG. 1 there is shown one example of a system 10 in accordance with the present disclosure. The system 10 in this example makes use of a controller 12 having system monitoring software 14 running thereon, which is in communication with a communications bus 16. First and second uninterruptible power supplies (UPSs) 18 and 20, respectively, are in communications with the communications bus 16, and thus with the controller 12. It will be appreciated immediately that while two UPSs have been illustrated, that a greater or lesser number of UPSs may be used with the system 10. In practice, in a large scale data center, dozens or more UPSs will typically be employed.

UPSs 18 and 20 are shown in FIG. 1 as supplying power over a dual bus system with independent AC power busses 19 and 21. Bus 19 enables UPS 18 to provide its output to a first remote power distribution panel 22 while bus 21 enables UPS 20 to supply its output to a second remote power distribution panel 24. The first remote power distribution panel 22 in this example has its output coupled to a first power distribution unit ("PDU") 26 while remote power distribution panel 24 has its output coupled to a second PDU 28. First PDU 26 has an output coupled to a network switch 30, to thus power the network switch, while second PDU 28 is used to power both a router 32 and a server 34. The server 34 has a service processor 34a for monitoring system health of the server such as power supply input and output voltages, fan speeds, temperature, processor utilization, and possibly other operating parameters. In this regard it will be appreciated that the service processor 34a is typically configured to communicate over a "maintenance" bus 36, which is an independent bus dedicated to communicating information relating to component health.

FIG. 1 also illustrates that the UPSs 18 and 20 are in communication with building switchgear 38. The building switchgear 38 typically includes an electric meter 40 for tracking power being drawn from the utility serving the facility where components 18-34 are located. The building switchgear 38 may be in communication with the controller 12 via a power quality measurement system 42 and via the communications bus 16. However, it is just as possible that the building switchgear 38 could be in direct communication with the controller 12. Both implementations are envisioned by the present disclosure.

The system monitoring software 14 is configured to generate control signals over the bus 16 to each of the UPSs 18 and 20 to selectively control either an output characteristic or an input characteristic of each of the UPSs 18 and 20. In one mode of operation the system monitoring software 14 may control the output voltage of a selected one of the UPSs 18 or 20 to raise or lower the output voltage slightly from its nominal value for a predetermined time (e.g., minutes for small systems or hours for large facilities with more devices to poll), but still maintain the output voltage well within an acceptable output range. For example, the system monitoring software 14 may signal the UPS to raise the output voltage of UPS 18 by 1.5-2.0% within a pre-determined timeframe of one minute. UPS 18 then maintains this state for a pre-determined length of time. For small systems with dozens of devices to poll the length of time may be an hour or less. Systems with hundreds or thousands of devices to poll may require UPS 18 to maintain the new output voltage state for 8 hours or longer. So if the nominal output of the UPS 18 is 208 v, a 2.0% increase would only raise the output voltage to 212.2 v, which would be well within an acceptable input voltage range for IT equipment as defined by the ITI curve published by Technical Committee 3 of the Information Technology Industry Council. This methodology may be used when measuring the voltage input at each of the downstream devices (i.e., PDUs 26 and 28, network switch 30, router 32 and server 34). In the event that voltage measurements are impractical, it is possible that the frequency of the AC output signal from the UPS 18 may be varied by a small amount, for example 1-3%, over a predetermined time period. For example, system monitoring software 14 may signal UPS 18 to adjust the output frequency up by 1.5% from a nominal 60 Hz to 61 Hz. The system monitoring software 14 then polls all devices downstream of UPS 18 and records the input frequency measured by the downstream devices. Those devices recording an increase in input frequency from 60 Hz nominal to approximately 61 Hz are then associated with UPS 18 within monitoring software 14. The change in the frequency of the output signal being input to a given one of the downstream devices (i.e., devices 22-34) may be detected by the device itself or by the power quality measurement system 42.

For signaling an upstream subsystem, for example the building switchgear 38, the system monitoring software 14 may signal the selected UPS 18 or 20 to vary its input power factor by a small percentage (e.g., 1-3%). This small change in input power factor of the selected UPS (e.g., UPS 18), will produce a small change in the power factor being supplied by the upstream building switchgear 38. The small change in power factor may be detected by the power quality measurement system 42.

The foregoing capabilities of the system 10 will be explained further in connection with the flowchart of FIG. 2. FIG. 2 sets forth a plurality of operations that may be implemented by the system 10 to determine which one or more devices downstream of a selected UPS are being powered by the selected UPS. Such a capability is highly valuable in many environments such as data centers where one needs to know all the devices that may be affected if a given UPS becomes inoperable. At operation 102 the system monitoring software 14 is used to initiate the UPS signaling. At operation 104 the UPS signaling is applied to a selected UPS, for this example UPS 18 of FIG. 1, to alter its output (voltage or frequency) by a controlled, minimal amount, and while maintaining the output parameter (voltage or frequency) within an acceptable operating range. At operation 106 each device downstream of the UPS 18 which is reliant on the UPS 18 for power will experience a change in its input voltage or frequency as a result of the output of the UPS 18 being altered. This change will be measured by the individual device or by a power quality measurement system 42, as indicated at operation 108. At operation 110 the system monitoring software 14 compares the signal variation applied to the UPS 18 with the obtained signal measurement from each downstream device (i.e., devices 22-34). If the system monitoring software 14 determines that none of the downstream devices has experienced an input signal variation in accordance with the variation applied to the UPS 18 output, then it may be concluded that none of the checked downstream devices are being powered by the UPS 18. In this event the system monitoring software 14 may then return the UPS 18 output to normal, as indicated at operation 114. If, however, at operation 110 the system monitoring software 14 detects one or more downstream devices that experience a change in its input signal variation in accordance with (i.e., in synchronization with) the change in the UPS 18 output, then it may be understood that each such device is being powered by the UPS 18. In that instance the system monitoring software 14 may report/record each downstream device that has been detected as being powered (or not powered) by the UPS 18, as indicated at operation 112. The system monitoring software 14 may then return the UPS 18 output back to normal at operation 114. In the illustration of FIG. 1, if the output from the UPS 18 is varied, the system monitoring software 14 will detect a corresponding change in the input signal to each of the remote power distribution panel 22, the power distribution panel 26 and the network switch 30, as these components are all being powered by the UPS 18. Components 24, 28, 32 and 34 would show no change in their input signal. Conversely, if the output signal from UPS 20 was varied according to the operations of FIG. 2, then operation 110 would detect a change in the input signal being received by components 24, 28, 32 and 34, but the input signals being applied to components 22, 26 and 30 would show no change. In this manner each device downstream from a selected UPS, which is dependent on the selected UPS for power, can be quickly identified without the need to interrupt operation of the downstream devices. The testing and identification of the downstream devices essentially is transparent to operation of each of the downstream devices.

Referring briefly to FIG. 3, a method 200 is shown by which the system 10 may modify the input power factor of a selected UPS to determine which one of two or more upstream building switchgear components is providing power to the selected UPS. The method 200 is somewhat similar to method 100 in that the system monitoring software 14 initiates the UPS signaling operation at operation 202, but instead of changing an output characteristic of the selected UPS (e.g., UPS 18), it causes a small change in the input power factor of the selected UPS 18, as indicated at operation 204. This change in power factor produces a change in the power factor being supplied by the building switchgear component that is powering the selected UPS 18, as indicated at operation 206. At operation 208 the output power factor from each building switchgear component is obtained by the power quality measurement system 42 and transmitted back to the controller 12. At operation 210 the system monitoring software 14 compares the output power factor reading from each of the building switchgear components present at the facility where the selected UPS 18 is located, before and after the power factor modification to the selected UPS 18, to identify the specific upstream building switchgear component associated (or not associated) with the selected UPS 18. At operation 212 the identified upstream building switchgear component is reported to the system monitoring software 14. At operation 214 the system monitoring software 14 may be used to return the input power factor of the selected UPS back to its original value. Again, no modification to the structure or operation of the upstream building switchgear is required for the above-described testing and identification process to be carried out.

It will be appreciated that even further operations may be taken with the UPSs 18 and 20 to improve the integrity of the determinations as to which downstream devices are being powered by which UPS 18 or 20. For example, re-testing may be performed on those devices that test positive for a correlation with the varied output from the UPS to make absolutely certain that a correlation exists. Monitoring software 14 may also vary the parameters of other UPS in a multi-bus system, but reversed in polarity from the device that is under interrogation. For example, controlling software 14 may vary the output voltage of a first UPS in a positive direction (+2%) while at the same time causing a second, third and so on UPS to vary its output voltage in a negative direction (−2%).

Still another advantage of the system 10 is that the output variation enabled by the system monitoring software 14 could be applied to one or two phase(s) at a time of the output of the selected UPS 18 or 20, that is, assuming the output is a multiphase phase output. In this manner the system 10 is able to detect not only each specific downstream device that is being powered by the selected UPS, but also which UPS phases are powering which specific inputs or phases of single, dual or three phase downstream devices.

It is a principal advantage of the system 10 that it uses the existing infrastructure of a facility to generate power signals that fall within the day-to-day power variations found in a typical data center. In other words the system 10 works in the background, thereby minimizing any impact to other equipment being monitored. Because the system 10 may be configured to detect changes in parameters it is not dependent to any great extent on device metering accuracy. Additionally, there is no need to load and maintain software on each of the downstream or upstream devices for the purpose of being able to identify those upstream and downstream devices that are associated with a specific UPS. And there is no need to take any downstream or upstream component off-line to perform the above-described operations. This significantly reduces the cost and complexity of the system 10, as well as prevents any negative impact on the continuing operations of the various upstream and downstream devices present at the facility. The system 10 is also readily scalable to accommodate the changing needs of a facility where more than one UPS is being used.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for detecting if a remote device is associated with a power supply, the system comprising:
   a controller having machine readable, non-transitory executable code running thereon for varying a characteristic of a signal being applied to the power supply;
   the controller further being configured to:
      receive a measurement of an electrical signal obtained by a measurement subsystem of the remote device, and transmitted from the remote device;
      compare the received measurement obtained from the measurement subsystem relating to a measured input signal at a power input of the remote device with the signal being applied to the power supply; and
      based on a comparison between the signal being applied to the power supply and the measured input signal being applied at the power input of the remote device, determining whether the remote device is electrically associated with the power supply.

2. The system of claim 1, wherein the signal being applied to the power supply is an input voltage signal, and the characteristic comprises a magnitude of the input voltage signal.

3. The system of claim 2, wherein the magnitude of the input voltage signal is varied by a percentage of between about 1.5%-2.0%.

4. The system of claim 1, wherein the signal being applied to the power supply is an alternating current input signal, and the characteristic comprises a frequency of the alternating current input signal.

5. A system for detecting if a remote power providing device is associated with a power supply, wherein the remote power providing device is upstream of the power supply, the system comprising:
   a controller having machine readable, non-transitory executable code running thereon for varying an input characteristic of the power supply;
   the controller further being configured to:
      perform an analysis of a measurement obtained from a measurement subsystem relating to a measured characteristic of power being provided from the remote power providing device, while the controller is varying the input characteristic of the power supply; and
      based on the analysis, determining whether the remote power providing device is electrically associated with the power supply; and
   wherein the varying of the input characteristic of the power supply includes generating a signal instructing the power supply to vary its input power factor, and the measured characteristic of power is a change in a power factor of the power being provided from the remote power providing device to the power supply.

6. The system of claim 5, wherein the controller varies the input power factor by a percentage between about 1%-3%.

7. The system of claim 1, wherein a plurality of the remote devices are present, and wherein the controller is configured to perform the comparison in connection with a measured input signal obtained from each of the plurality of remote devices, to determine which one or more of the plurality of remote devices are associated with the power supply.

8. The system of claim 7, wherein the determination as to which one or more of the plurality of remote devices are associated with the power supply indicates which ones of the plurality of remote devices are being powered by the power supply.

9. The system of claim 1, wherein the controller varies the characteristic of the signal being applied to the power supply for a predetermined time duration.

10. The system of claim 9, wherein the predetermined time duration is one hour or less.

11. A system for detecting and mapping which ones of a plurality of electrically powered devices are being powered by a power supply, the system comprising:
    a controller having machine readable, non-transitory executable code running thereon for varying a characteristic of a power output signal being supplied by the power supply, by a predetermined amount, to produce a modified input signal for application to one or more electrically powered devices downstream of the power supply; and
    the controller further being configured to:
       compare electrical signal measurements obtained by, and received from, a measurement subsystem, each said electrical signal measurement relating to a measured input signal present at an input of each of the plurality of electrically powered devices; and based on comparisons between the measured input signals and the modified input signal, to detect which ones of the plurality of electrically powered devices are being powered by the given power supply.

12. The system of claim 11, wherein the characteristic of the power output signal comprises a voltage.

13. The system of claim 11, wherein the characteristic of the power output signal comprises a frequency.

14. The system of claim 11, wherein the given power supply comprises an uninterruptible power supply (UPS).

15. A method for detecting if a remote device is associated with a power supply, the method comprising:

using a controller having machine readable, non-transitory executable code running thereon to vary a characteristic of a signal being applied to the power supply;

using the controller to:

receive and compare an electrical signal measurement obtained from a measurement subsystem relating to a measured input signal associated with the remote device; and determine, based on a comparison between the signal being applied to the power supply and the measured input signal associated with the remote device, indicated by the electrical signal measurement, whether the remote device is electrically associated with the power supply.

16. The method of claim 15, wherein said varying a characteristic of a signal being applied to the power supply comprises varying one of:

a magnitude of an input voltage signal being applied to the power supply; and a frequency of the input voltage signal being applied to the power supply.

17. A method for detecting if a power supply is associated with a remote power providing device upstream of the power supply, the method comprising:

using a controller having machine readable, non-transitory executable code running thereon to vary a characteristic of a signal being applied to an input of the power supply;

using the controller to:

compare a measurement obtained from a measurement subsystem relating to a characteristic of an output signal associated with the remote power providing device with the signal being applied to the input of the power supply, to determine whether the remote power providing device is electrically associated with the power supply; and wherein said varying a characteristic of a signal being applied to the input of the power supply comprises using the signal to instruct the power supply to vary its input power factor, and the characteristic is a magnitude of change of the input power factor.

18. The method of claim 17, wherein said varying a characteristic of a signal being applied to an input of the power supply comprises varying an input power factor of the power supply.

* * * * *